United States Patent [19]
Hickman et al.

[11] 4,043,015
[45] Aug. 23, 1977

[54] METHOD OF FORMING A HEADER ASSEMBLY

[75] Inventors: Charles E. Hickman; William G. Hastings, both of Adrian, Mich.

[73] Assignee: Brazeway, Inc., Adrian, Mich.

[21] Appl. No.: 715,557

[22] Filed: Aug. 18, 1976

[51] Int. Cl.² ............................................. B23P 15/26
[52] U.S. Cl. .................................... 29/157.4; 72/325; 285/137 R
[58] Field of Search ................. 72/325, 324; 29/157.4, 29/157.5, 157.6; 228/164, 170, 171, 173, 174, 182, 183, 184; 165/168, 169, 170, 171, 172, 173, 174, 175, 176; 285/137 R

[56] References Cited
U.S. PATENT DOCUMENTS

| | | | |
|---|---|---|---|
| 1,169,209 | 1/1916 | True et al. | 29/157.6 |
| 1,264,455 | 4/1918 | True | 29/157.4 |
| 1,331,047 | 2/1920 | Broido | 29/157.4 X |
| 1,503,469 | 8/1924 | Birmingham | 29/157.6 X |
| 1,678,740 | 7/1928 | Magis | 29/157.6 |
| 2,396,110 | 3/1946 | McKee | 29/157.6 |
| 2,927,369 | 3/1960 | Coblentz et al. | 113/118 D X |
| 3,648,768 | 3/1972 | Scholl | 165/171 |

FOREIGN PATENT DOCUMENTS

| | | | |
|---|---|---|---|
| 21,066 | 11/1892 | United Kingdom | 29/157.4 |

*Primary Examiner*—James R. Duzan
*Attorney, Agent, or Firm*—Krass & Young

[57] ABSTRACT

A method is disclosed of forming a header assembly in which a plurality of tubes transition into a single header passage. The method includes forming a blank extrusion comprised of a plurality of juxtaposed tube elements interconnected by web sections of a thickness approximately double the wall thickness of the individual tube members in the blank. The blank is placed in a female die and a wedge-shaped male forming tool is advanced into the blank for a portion of the length of the blank, the male forming tool being configured to split the interior of the blank along the center of the web sections as the tool advances thereinto, forcing the web sections and connected tube portions apart and into contact with the wall of the female die cavity to form the header section. Further forming steps are disclosed including a severing of the web sections interconnecting the tubes along the remainder of the length of the blank, as well as appropriate reshaping of the header section subsequent to the initial forming operation in order to configure the same to the particular application for which the header assembly is to be used.

7 Claims, 8 Drawing Figures

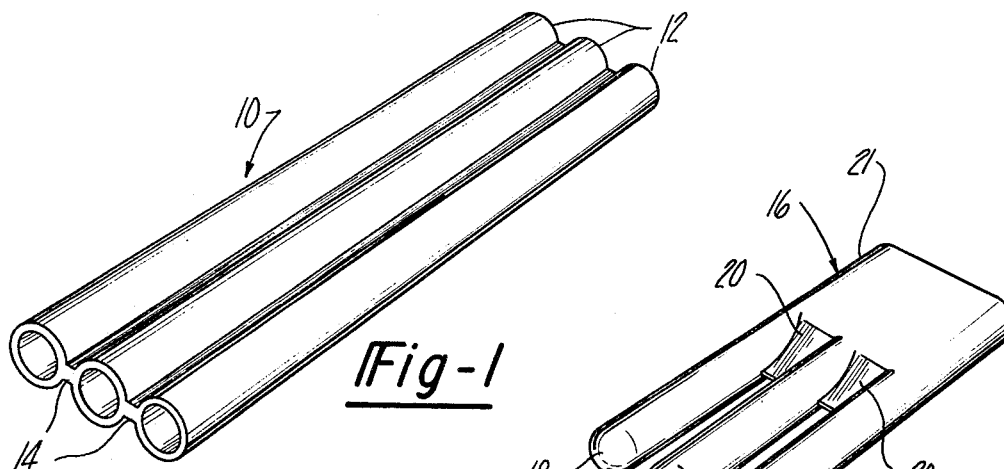
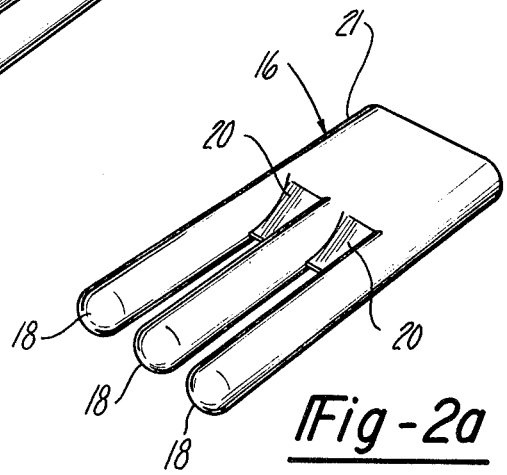
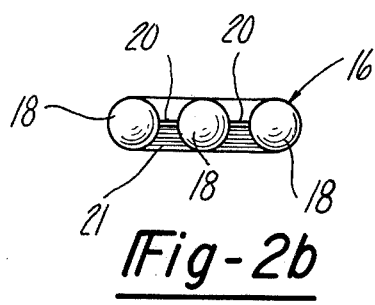
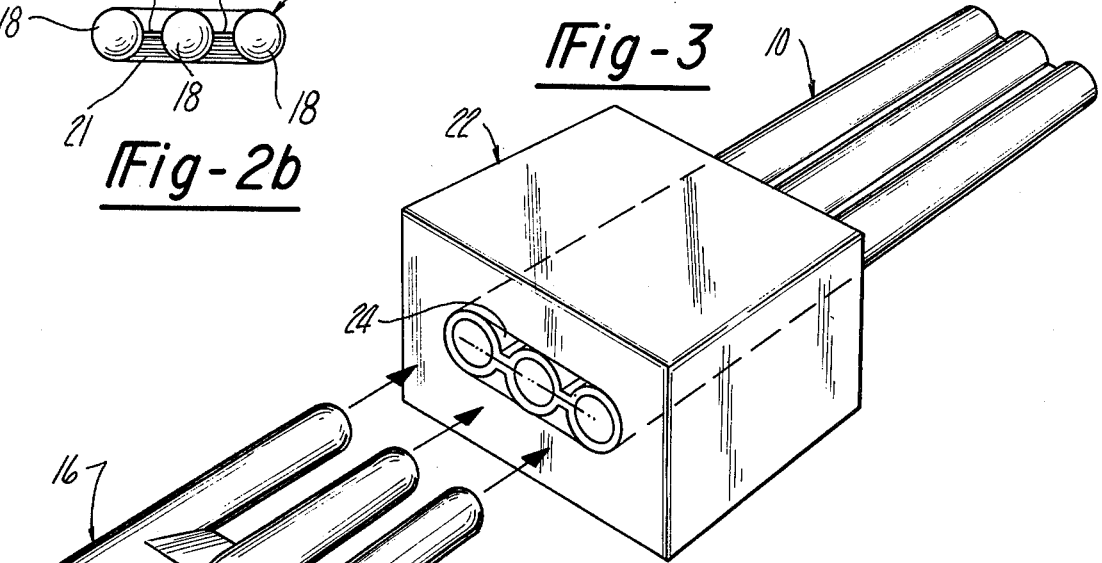
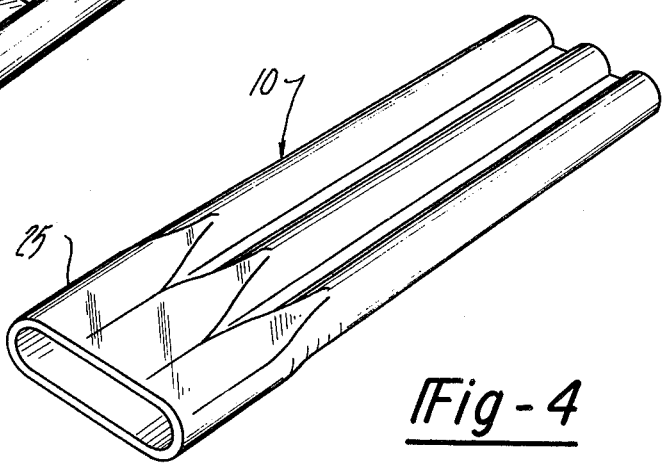

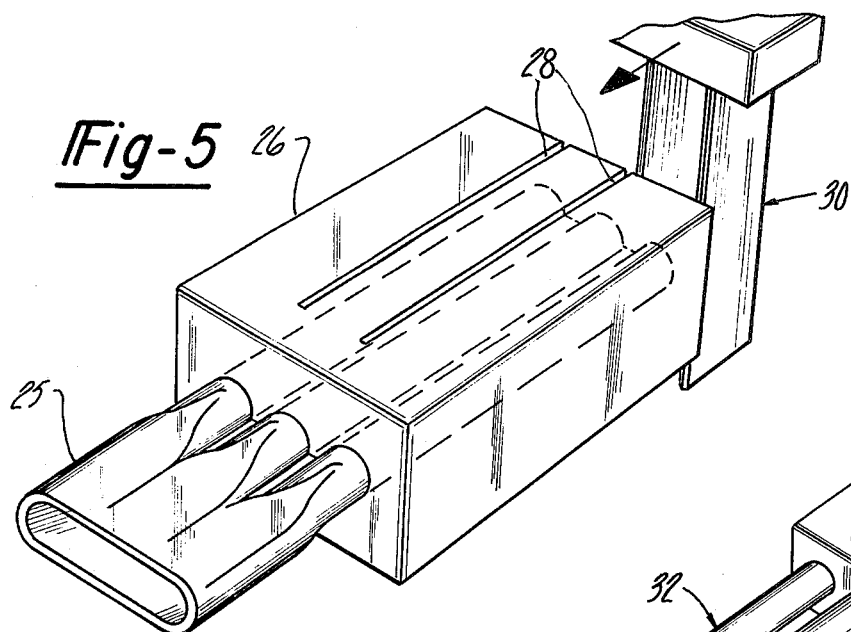
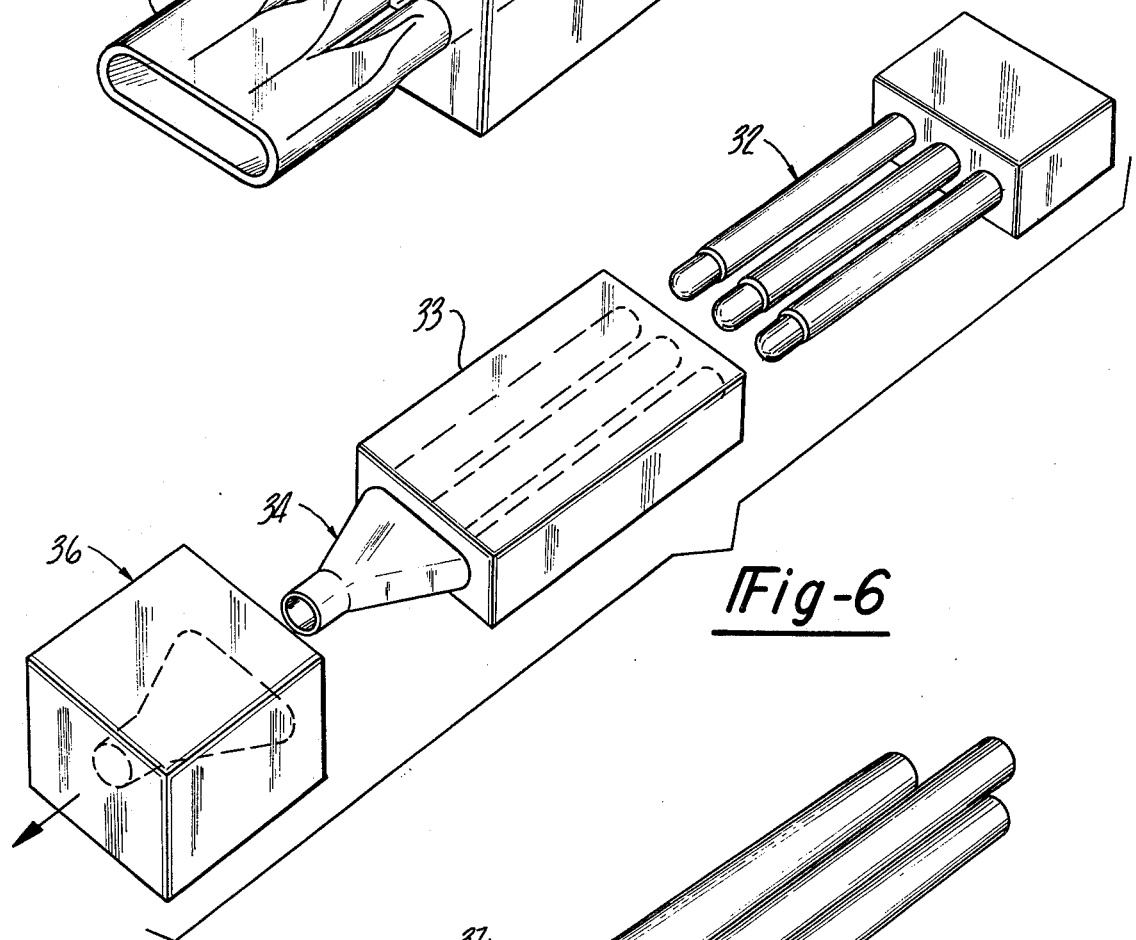
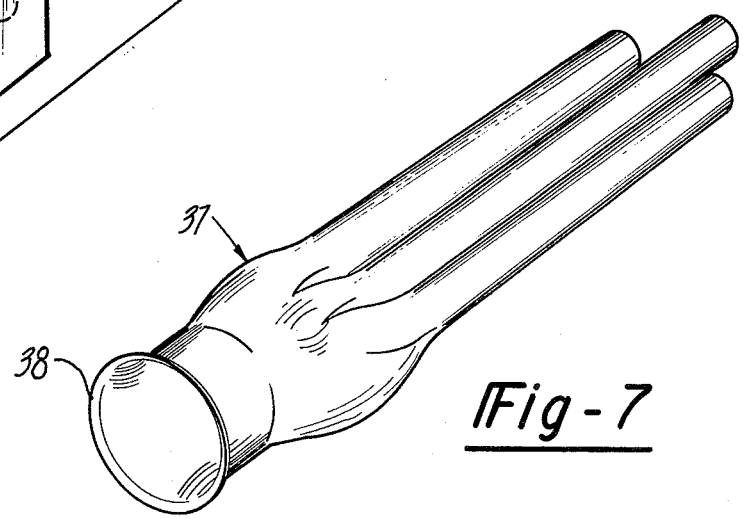

METHOD OF FORMING A HEADER ASSEMBLY

BACKGROUND OF THE INVENTION

1. FIELD OF THE INVENTION

This invention concerns methods of manufacturing headers and more particularly a method of cold forming header assemblies without brazing or welding.

2. DESCRIPTION OF THE PRIOR ART

Due to the upward trend in cost of the copper metal which has been widely used in manufacturing finned tube heat exchangers such as are used in refrigeration and air conditioning systems, efforts have been periodically exerted to reduce the quantity of copper used in such assemblies. As a result of these efforts, the use of lower cost aluminum has progressively become more extensive, such as the use of aluminum fins on copper tubings. Aluminum has also been used extensively in the tubing portions thereof but has suffered from some disadvantages in manufacturing techniques required over those required with copper. Specifically, difficulties are encountered in the brazing of aluminum such as is required in current manufacturing methods for forming header assemblies, i.e. assemblies in which a plurality of tubes transition into a common header passage. These difficulties arise as a result of the tendency of aluminum to form surface oxides, requiring the use of fluxes which are relatively corrosive to the aluminum, so that rather extensive cleaning operations must be performed after the brazing operations. In addition, the brazed joints in such assemblies are difficult to make with great reliability so that such joints account for high percentage of the leakage failures of such assemblies. This arises in part because header joints, being non-linear, cannot be made with the use of continuous automated equipment, which factor also contributes to the relatively high costs of this process.

Alternative forming methods such as disclosed in the U.S. Patents granted to Charles True, U.S. Pat. No. 1,264,455; to Charles True and N.T. McKee, U.S. Pat. No. 1,169,209; to Charles True and C.W. Brandt, U.S. Pat. No. 1,255,355, to B. Broido, U.S. Pat. No. 1,331,047; to T.F. Birmingham, U.S. Pat. No. 1,503,469; to A. Magis, U.S. Pat. No. 1,678,740; and to G.E. Ryder, U.S. Pat. No. 1,471,944 all describe an approach to forming such a header assembly by splitting a plurality of tubes positioned in a female die by means of a male forming member. This approach necessarily splits the walls of the tubes and requires heating and welding of the split portions in order to form a fluid tight header section. It can be appreciated that this necessity for heating to welding temperatures results in a relatively expensive form of manufacture and in addition, the necessity of forming good welds reduces the reliability of the resultant structure, particularly for aluminum.

Yet another approach which involves a brazing operation is disclosed in U.S. Pat. No. 2,927,369 to W. H. Coblantz et al. In this method, corrugated rolled strips are brazed together to form the tube bundle with the header section formed integral therewith but this method suffers from the disadvantages aforementioned in regard to the brazing of aluminum.

Other possible methods of cold forming such sections generally would involve relatively expensive mandril extrusion processes, which would limit the length of the header sections and also require relatively extensive capital equipment.

It is therefore an object of the present invention to provide a cold forming method for forming a header section which does not involve the use of extensive capital equipment and tooling and eliminates the need for welding and brazing operations.

SUMMARY OF THE INVENTION

These and other objects which will become apparent upon reading of the following specification and claims is accomplished by a method involving splitting the interior of an extruded blank consisting of a plurality of juxtaposed tubes interconnected by web sections and through the wall portions connected thereby of a thickness equal to approximately double the tube wall thickness, the splitting taking place along the centerline of the web sections for a portion of the length of the extruded blank, forcing the split portions outwardly without splitting through the portions to eliminate welded seams into contact with a containing female die cavity shaped correspondingly to the header section. The splitting is carried out by means of a wedge-shaped male tool having a plurality of pilots adapted to locate the tool by mating with the tube interiors, and also having a body section adapted to mate with the female die cavity. The unsplit tube sections may then be separated by a forming or sawing operation to allow independent bending and connecting of the tube elements. The header section may be reformed in subsequent forming steps to the shape required for the particular application.

DESCRIPTION OF THE DRAWINGS

FIG. 1 is a perspective view of a typical extruded blank suitable for use in practicing the method of the present invention;

FIG. 2a is a perspective view of the male tool used in splitting the extruded blank depicted in FIG. 1;

FIG. 2b is a front view of the male tool depicted in FIG. 2a;

FIG. 3 is a representation of the forming process according to the present invention executed on the blank depicted in FIG. 1;

FIG. 4 is a perspective view of a reshaped blank after performing the forming operations depicted in FIG. 3;

FIG. 5 is a representation of a subsequent web severing process performed on the unsplit portion of the extruded blank;

FIG. 6 is a representation of typical reshaping operations carried out on the split blank, these operations shown as being performed on the severed tube elements as well as the header section;

FIG. 7 is a perspective view of the header assembly in which the header portion has been reshaped for a particular application and the tube elements have been cut to finished length.

DETAILED DESCRIPTION OF THE DRAWINGS

In the following specification, particular teminology will be utilized for the sake of clarity and particular implementation of the method described in the drawings. But it is to be understood that the invention is capable of many differing applications and implementations and the same is not to be construed in a limiting sense.

Referring to the drawings, FIG. 1 depicts in perspective form, a blank extrusion 10 which forms the starting point of the manufacturing process according to the present invention. This blank 10 is comprised of a plurality of juxtaposed passage elements, comprised of tubes 12 interconnected by respective integral web sections 14. The web sections 14 are of a thickness equal to approximately double the wall thickness of the tubes 12, for a purpose to be disclosed hereinafter. Inasmuch as the blank 10 may be produced by standard extrusion techniques, details of the method of producing the same are not here included.

According to the method of the present invention, a portion of the length of the blank 10 is formed into a header passage by splitting the interior of the blank 10 along the centerline of the web sections 14, and through the portions of the wall of the connected passage elements or tubes 12 connected thereby forcing the split portions outwardly into contact with a female die cavity. This splitting operation is carried out be a male wedge tool 16 depicted in FIGS. 2a and 2b. This tool includes a plurality of locating pilots 18 adapted to be slidably fit within each of the respective tube sections 12. Wedge sections 20 are formed intermediate the pilots 16 adapted to split each of the integral web sections 14 in the blank 10. The tool body 21 is configured to mate with the female die cavity to form the final header passage configuration. The splitting operation is depicted in FIG. 3 in which the blank 10 is positioned within the cavity of the female die 22, the die cavity 24 being configured in the shape of the finished header section as described. The male tool 16 is then advanced by conventional means so that the pilot sections 18 enter the respective tube openings to be located thereby. Further advance causes the knife or wedge sections 20 to split the respective integral web sections 14 along their centerlines, forcing the severed portions outwardly, without splitting of the portions to eliminate welded seams with the body portion 21 of the male tool 16 producing engagement with the surface formed by the cavity 24 so as to form the completed header section.

Results of the splitting operation can be seen in the depiction of FIG. 4, in which the splitting of the individual webs 14 has been carried out along a portion 25 of the length of the blank 10.

As noted above, other operations would normally be carried out on the partially split blank, either simultaneously or subsequently such as those which would enable independent connections to be made to the individual tube sections 12, shown in FIG. 5 as a severing operation, in which a die 26 having appropriate slits 28 formed therein would retain the unsplit portion 25 of the blank 10, with appropriate slitter tools 30 being utilized to sever the web sections 14. This would also allow independent bending of the individual tubes 12 to various positions, as well as allowing conventional connections to be made with the remainder of the system.

Other operations would be as shown in FIG. 6 in which a sizing tool 32 is advanced into the tube sections contained in a die 33 to produce a particular tube diameter. Reshaping of the header section 34 could also be carried out by male and female tubes to adapt it to the particular application such as the female die 36 shown in FIG. 6.

A typical final product 37 is shown in FIG. 7 with a flange portion 38 being formed thereon. Such reshaping would be by conventional cold forming techniques or other appropriate conventional methods well known to those skilled in the art and details thereof are not here included.

It will be appreciated by those skilled in the art that many variations and applications of this technique are possible. For example, any number of a plurality of tubes may be transitioned into a common header section and two of said sections could easily be interconnected by appropriate reshaping of the header sections to provide transitions from two passages to three passages, three passages to four passages, etc. or plurality of passages may be transitioned into the common header section with a subsequent transition back into a plurality of passages.

The many advantages of this process will also be appreciated by one skilled in the art. That is, the relatively inexpensive tooling required, as well as the ease with which the process may be carried out. The process also does not involve any welded or brazed seams, nor any heating operations during the manufacturing process and almost complete assurance of a leak-free resultant product. This latter advantage is of a critical nature in air conditioning and refrigeration heat exchanges, the manufacture of which this process would be particularly well adapted. Furthermore, header sections of almost any length are easily possible as compared with mandril forming techniques.

While this technique has great advantages in the context of aluminum products due to the elimination of brazing operations, its application is of course not limited to aluminum and indeed could be applied to any material having working characteristics compatible with the forming operations described.

The embodiments of the invention in which an exclusive property or privilege is claimed are defined as follows:

1. A method of forming a header consisting of a plurality of passage elements transitioning into a common header passage, the method comprising:
   forming a blank comprised of a plurality of juxtaposed passage elements with the juxtaposed passage elements integrally interconnected with respective web sections;
   splitting the inside of said blank through thickness of said integral web sections and the wall portions of said passage elements connected by said web sections for a portion of the length of said blank;
   forcing said split web portions outwardly away from each other to cold form said header passage without splitting through said portions, whereby said transition is provided without welding of said portions.

2. The method of claim 1 wherein in forming said blank said integral web sections are formed of a thickness approximately double the wall thickness of said passage elements, and wherein in splitting step, said splitting is carried out along the approximate center of said web sections.

3. The method according to claim 1 wherein said splitting and forcing steps are carried out by means of a wedging action whereby said splitting and forcing steps are carried out simultaneously.

4. The method according to claim 1 further including the step of severing the integral web sections along the unsplit portion of said blank.

5. The method according to claim 1 wherein in said forming step said split portions are forced outwardly into contact with a cavity in a female die shaped correspondingly to said header passage.

6. The method of claim 1 wherein said splitting and forcing steps are carried out by means of a wedge-shaped male tool having a body section corresponding to the inside configuration of said header passage.

7. A header assembly comprised of a plurality of passage elements transitioning into a common header passage, said header assembly produced by the method of:

forming a blank comprised of a plurality of juxtaposed passage elements with the juxtaposed passage elements interconnected with respective integral web sections;

splitting the inside of said blank through the thickness of said integral web sections and the wall portions connected thereby for a portion of the length of said blank;

forcing said split portions outwardly without splitting through said portions to form said header passage, whereby said transition is without welded seams.

* * * * *